US010786698B2

(12) United States Patent
Endemann et al.

(10) Patent No.: US 10,786,698 B2
(45) Date of Patent: Sep. 29, 2020

(54) MUSCLE TRAINER AND METHOD FOR THE PRODUCTION THEREOF

(71) Applicant: BASF SE, Ludwigshafen am Rhein (DE)

(72) Inventors: Ulrich Endemann, Ludwigshafen (DE); Moritz Endemann, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 62 days.

(21) Appl. No.: 16/093,386

(22) PCT Filed: Apr. 12, 2017

(86) PCT No.: PCT/EP2017/058789
§ 371 (c)(1),
(2) Date: Oct. 12, 2018

(87) PCT Pub. No.: WO2017/178533
PCT Pub. Date: Oct. 19, 2017

(65) Prior Publication Data
US 2019/0209883 A1    Jul. 11, 2019

(30) Foreign Application Priority Data

Apr. 15, 2016  (EP) ..................................... 16165512
Sep. 12, 2016  (EP) ..................................... 16188354

(51) Int. Cl.
*A63B 21/02*    (2006.01)
*A63B 21/00*    (2006.01)
(Continued)

(52) U.S. Cl.
CPC ........ *A63B 21/026* (2013.01); *A63B 21/0004* (2013.01); *A63B 21/00043* (2013.01);
(Continued)

(58) Field of Classification Search
CPC ... A63B 21/026; A63B 21/0004; A63B 23/12; A63B 21/4035; A63B 21/4023;
(Continued)

(56) References Cited

U.S. PATENT DOCUMENTS 3,219,342 A * 11/1965 Melchiona ........... A63B 21/045
                                                                482/49
3,377,722 A *  4/1968 Downing ............. A43B 13/182
                                                                 36/7.8
(Continued)

FOREIGN PATENT DOCUMENTS

CN       203476024 U     3/2014
DE    102012108655 A1    3/2014
(Continued)

OTHER PUBLICATIONS

Co-pending U.S. Appl. No. 16/093,324, filed Oct. 12, 2018.
(Continued)

*Primary Examiner* — Garrett K Atkinson
(74) *Attorney, Agent, or Firm* — Armstrong Teasdale LLP

(57) ABSTRACT

Described herein is a muscle trainer including a first and a second curved, elongate spring element, the two spring elements being arranged with their concave sides facing each other, having joint elements at their respective end areas and being connected to each other at their two end areas via joints formed from the joint elements. Also described herein is a method for producing such a muscle trainer.

13 Claims, 10 Drawing Sheets

Figure 1:
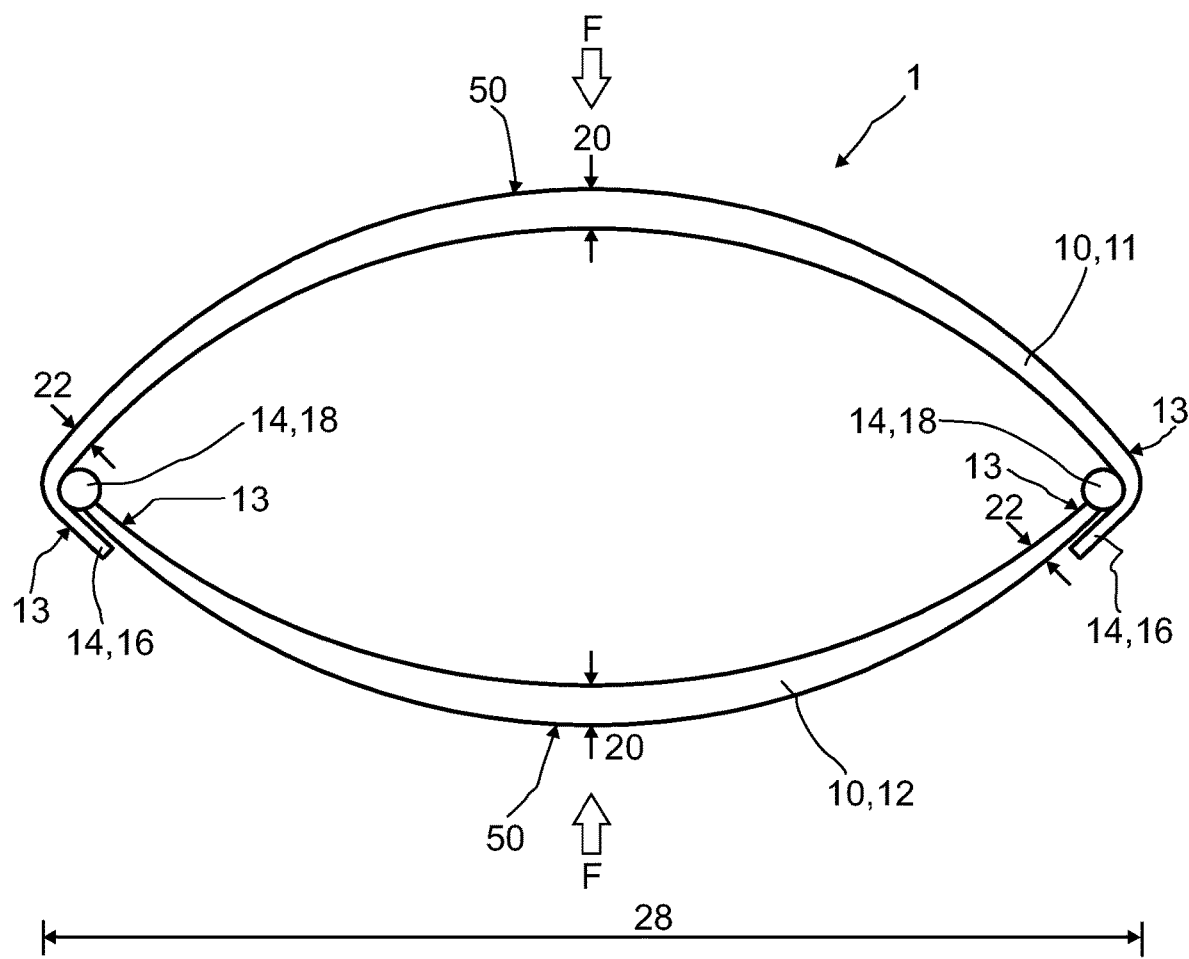

(51) Int. Cl.
| | |
|---|---|
| *A63B 21/04* | (2006.01) |
| *A63B 21/045* | (2006.01) |
| *A63B 21/05* | (2006.01) |
| *A63B 23/035* | (2006.01) |
| *A63B 23/04* | (2006.01) |
| *A63B 23/16* | (2006.01) |
| *A63B 23/12* | (2006.01) |
| *B29C 69/00* | (2006.01) |
| *B29K 59/00* | (2006.01) |
| *B29L 31/00* | (2006.01) |

(52) U.S. Cl.
CPC ...... *A63B 21/00185* (2013.01); *A63B 21/045* (2013.01); *A63B 21/0414* (2013.01); *A63B 21/05* (2013.01); *A63B 21/4019* (2015.10); *A63B 21/4023* (2015.10); *A63B 21/4035* (2015.10); *A63B 23/0355* (2013.01); *A63B 23/03508* (2013.01); *A63B 23/04* (2013.01); *A63B 23/12* (2013.01); *A63B 23/16* (2013.01); *A63B 2209/00* (2013.01); *B29C 69/00* (2013.01); *B29K 2059/00* (2013.01); *B29L 2031/774* (2013.01)

(58) Field of Classification Search
CPC .......... A63B 21/00043; A63B 21/4019; A63B 23/16; A63B 23/04; A63B 23/0355; A63B 23/03508; A63B 21/05; A63B 21/045; A63B 21/0414; A63B 21/00185; A63B 2209/00; B29L 2031/774; B29K 2059/00; B29C 69/00
See application file for complete search history.

(56) References Cited

U.S. PATENT DOCUMENTS

| | | | | |
|---|---|---|---|---|
| 4,826,151 A | * | 5/1989 | Nuredin | A63B 21/0004 297/423.38 |
| 5,292,295 A | | 3/1994 | Gerlach et al. | |
| 5,451,059 A | * | 9/1995 | Weis | A63B 69/3655 473/139 |
| 5,582,565 A | * | 12/1996 | Soria | A63B 21/00047 482/141 |
| 6,117,053 A | * | 9/2000 | Chiu | A63B 22/02 482/51 |
| 6,258,196 B1 | * | 7/2001 | Suzuki | A61F 13/51108 156/176 |
| 6,673,288 B2 | * | 1/2004 | Dargavell | B29C 41/18 264/102 |
| 7,318,793 B2 | * | 1/2008 | Dubrul | A63B 21/00181 482/141 |
| 8,864,638 B2 | * | 10/2014 | Ross | A63B 21/1636 482/141 |
| 8,998,783 B2 | * | 4/2015 | Orenstein | A63B 23/1236 482/141 |
| 9,533,191 B2 | * | 1/2017 | Carbone | A63B 26/003 |
| 9,931,529 B2 | * | 4/2018 | Orenstein | A63B 23/1236 |
| 2003/0227103 A1 | * | 12/2003 | Dargavell | B29C 41/18 264/102 |
| 2003/0228962 A1 | * | 12/2003 | Herman | A63B 21/026 482/126 |
| 2004/0102296 A1 | * | 5/2004 | Dubrul | A63B 21/00181 482/141 |
| 2013/0123081 A1 | * | 5/2013 | Boland | A63B 21/4023 482/141 |
| 2013/0157817 A1 | * | 6/2013 | Green | A63B 21/045 482/122 |
| 2018/0290401 A1 | * | 10/2018 | Radtke | C08J 5/18 |

FOREIGN PATENT DOCUMENTS

| | | |
|---|---|---|
| DE | 202014009325 U1 | 2/2015 |
| FR | 2961708 A3 | 12/2011 |
| KR | 20130012427 A | 2/2013 |

OTHER PUBLICATIONS

English Translation of International Preliminary Report on Patentability for International Patent Application No. PCT/EP2017/058789, dated Oct. 18, 2018, 6 pages.
International Search Report issued in PCT/EP2017/058789 dated Jun. 30, 2017, 3 pages.

* cited by examiner

MUSCLE TRAINER AND METHOD FOR THE PRODUCTION THEREOF

CROSS-REFERENCE TO RELATED APPLICATIONS

This application is the national stage entry of PCT/EP2017/058789, filed on Apr. 12, 2017, which claims the benefit of priority to European Patent Application No. 16165512.1, filed Apr. 15, 2016, and European Patent Application No. 16188354.1, filed Sep. 12, 2016, each of which is incorporated by reference in its entirety herein.

BACKGROUND OF THE INVENTION

The invention relates to a muscle trainer with two spring elements, and to a method for the production of the muscle trainer.

Various types of muscle trainers for building up muscles are known in the prior art. For example, hand trainers are used to strengthen the muscles of the hands. The user applies a force to the hand trainer and, by means of an elastic element, the hand trainer generates an opposing force. Conventional hand trainers use a metal spring as the elastic element. Such hand trainers have to be provided with suitable grips, which complicates their design and production. The grips are generally made from different materials, for example from a plastic. When such a hand trainer is actuated by the user, the grips are moved toward each other under the applied load and, when the load is removed, they spring back again to the starting position.

The utility model DE 20 2014 009 325 U1 discloses a hand trainer made of a relatively flexurally stiff surface element and of an elastic element, wherein the elastic element has a seat for the thumb, and the flexurally stiff surface element has further finger seats. The fingers other than the thumb are in this way brought into a fixed position relative to the thumb. The training device thus permits targeted training of the muscles of the thumb. Further parts of the hand muscles cannot be trained.

The laid-open specification DE 10 2012 108 655 A1 describes a fitness apparatus with elastic elements, wherein the elastic elements comprise polyurethane. Several elastic elements can be connected to one another in the fitness apparatus, resulting in a suitably stiffer elastic element. However, this connection requires a fixed union, which takes up quite a lot of space. Moreover, high levels of material stress occur at the connection when a load is applied.

It is an object of the invention to make available a muscle trainer that has a compact format and is easy to produce. It is a further object of the invention to ensure that the material stress occurring in a muscle trainer when actuated is kept as low as possible. The force needed for the actuation and the deformation that occurs should preferably be comparable to conventional muscle trainers.

DETAILED DESCRIPTION OF THE INVENTION

A muscle trainer comprising a first and a second curved, elongate spring element is proposed, the two spring elements being arranged with their concave sides facing each other, having joint elements at their respective end areas and being connected to each other at their two end areas via joints formed from the joint elements.

The shape of the two spring elements can, for example, be that of a substantially rectangular plate, wherein the rectangular plate has a long side and a shorter side. The end areas are arranged at the ends of the long side. The rectangular plate is curved, wherein the axis of curvature runs parallel to the short side and perpendicular to the long side. Setting aside the curvature of the spring element, the direction parallel to the short side is regarded as the transverse direction, the direction parallel to the long side is regarded as the longitudinal direction, and the direction perpendicular to the surface of the plate is regarded as the vertical direction. This shape of the spring elements can also be described as a perpendicular cylinder segment, wherein the base surface of the perpendicular cylinder segment is substantially crescent-shaped. The direction parallel to the connection of the two ends of the crescent shape is designated as the longitudinal direction, and the direction perpendicular to the base surface of the cylinder is designated as the transverse direction. The vertical direction is perpendicular both to the longitudinal direction and also to the transverse direction. The two end areas of a spring element are arranged at the ends of the crescent shape as described here.

The muscle trainer comprises two such elongate, curved spring elements, which are arranged relative to each other in the muscle trainer in such a way that their concave sides face each other. The two spring elements are connected to each other at their ends by joints. The muscle trainer is preferably composed of precisely two spring elements.

Each of the spring elements has a joint element at both of its end areas, wherein a respective joint element of the first spring element forms a joint together with a corresponding joint element of the second spring element. The two joints thus formed connect the two spring elements in such a way that, when the muscle trainer is actuated with a force being applied parallel to the vertical direction, the connections between the two spring elements are advantageously subjected to no or only very slight bending loads and bending stresses. The greatest bending load is applied to the part of the spring element lying at the center between the two end areas. The term bending stress signifies the mechanical stress in the material. The spring element is preferably designed in such a way that the bending stress is maintained more or less constant along the length of the spring element. The term bending load signifies the bending moment, which decreases from the center of the spring element toward the edge.

When the muscle trainer is actuated, an opposing force is generated by the spring elements, and a person using the muscle trainer has to work against this opposing force. The magnitude of the opposing force is determined by the shape of the spring elements and by the material used and depends on the muscles that are to be exercised using the muscle trainer. The muscle trainer is preferably designed as a hand trainer.

The wall thickness of a spring element preferably varies in the longitudinal direction, i.e. along the length from one end to the other end, wherein the greatest wall thickness is preferably reached at the center. The greatest wall thickness preferably lies in the range of 2 to 8 mm and particularly preferably in the range of 3 to 6 mm. The smallest wall thickness preferably lies in the range of 0.5 to 5 mm and particularly preferably in the range of 1 to 3 mm. By virtue of the variation of the wall thickness, the spring element can be made strongest in those areas where the greatest bending loads occur.

Alternatively or in addition, the width of the spring element, i.e. the length of the short side, can vary in the longitudinal direction. The spring element preferably has its greatest width at the center. Depending on the intended use, the greatest width preferably lies in the range of 20 mm to 150 mm. In the use as a hand trainer, the greatest width is preferably in the range of 20 mm to 50 mm and particularly preferably in the range of 25 mm to 35 mm. The smallest width preferably lies in the range of 5 mm to 100 mm. In the use as a hand trainer, the smallest width preferably lies in the range of 5 mm to 25 mm and particularly preferably in the range of 10 mm to 20 mm. If there is no variation of the width, then the width of the spring elements is preferably chosen in the range of 20 mm to 150 mm, or, in the use as a hand trainer, preferably in the range of 20 mm to 50 mm. The first spring element and the second spring element preferably have the same width or the same profile of the width.

The length of the spring elements, i.e. the extent in the longitudinal direction, preferably lies in the range of 150 mm to 350 mm, or, in the use as a hand trainer, particularly preferably in the range of 180 mm to 230 mm.

The muscle trainer is preferably actuated in such a way that force is applied in the area of the center of the surfaces of the spring elements. For this purpose, it is preferable for a force introduction area to be formed on each of the spring elements, such that the muscle trainer is easier for the user to use or grip. In the case where the muscle trainer is designed as a hand trainer, the force introduction areas are preferably designed as gripping areas.

The maximum spring force of the muscle trainer is set through the choice of the geometry of the spring elements and through the choice of the material of the spring elements and preferably lies in the range of 40 to 300 N and particularly preferably in the range of 50 to 100 N. The maximum spring force is reached when, under the application of force, the spring elements are deformed in such a way that the spring elements touch each other in the area of the center of the surfaces of the spring elements. In this state, the curvature of the spring elements is substantially canceled by the deformation. The maximum possible deformation upon actuation of the muscle trainer is defined by the greatest distance between the two spring elements and is predetermined by the curvature of the spring elements. The greatest distance between the two spring elements preferably lies in the range of 20 mm to 200 mm or, in the use as a hand trainer, particularly preferably in the range of 50 to 100 mm. The maximum spring force and the maximum spring deformation can also be limited (e.g. in order to achieve more comfortable operation in the use as a hand trainer) by abutments introduced between the force introduction areas of the two spring elements. In this case, the curvature of the spring elements is not completely canceled even when the maximum spring force is applied.

The joint elements of the first spring element are preferably designed as brackets, wherein the brackets are bent in the direction of the concave side of the first spring element and at least partially enclose the joint elements of the second spring element.

In the area adjoining the spring element, the brackets have a small bend radius compared to the curvature of the spring element and run out in an area that is not curved or that is only slightly curved. The area with the small bend radius forms a bearing for the joint elements of the second spring element. The joint elements of the second spring element are mounted in the joint elements or brackets of the first spring element such that, when the muscle trainer is actuated, the joint elements of the second spring element can execute a rotational movement relative to those of the first spring element. This mutual mobility avoids or minimizes the flexural stress in the area of the joints when the muscle trainer is actuated.

The joint elements of the second spring element are preferably rounded, and the joint elements of the first spring element have a seat with a corresponding curvature.

The joint elements of the first spring element are preferably designed as snap-action elements, and the joint elements of the second spring element are designed as latching elements, wherein the latching elements are received in the snap-action elements. The latching elements and the snap-action elements both represent functional elements which together permit a snap-fit connection between the first spring element and the second spring element. The snap-action element represents the functional element which, in the resulting form-fit connection, at least partially encloses the functional element designated as latching element. The form-fit connection limits a relative movement between a respective joint element of the first spring element and of the second spring element, such that accidental separation of the two spring elements is suppressed or made difficult.

The snap-action elements and the latching elements are preferably cylindrical. The latching element can be designed in the form of a perpendicular circular cylinder, and the snap-action element can be designed as a cylinder with a circular ring segment as base surface, wherein the cutout from the circular ring is preferably greater than 180°. Thus, the latching element is enclosed by the snap-action element in such a way that the snap-action element has to be elastically deformed in order to release or produce the snap-fit connection.

Preferably, in each case a joint element of the first spring element establishes a form-fit connection with a joint element of the second spring element, which form-fit connection prevents a lateral movement of the first spring element relative to the second spring element. A lateral movement is regarded here as a movement parallel to the transverse direction defined for the spring elements.

The form-fit connection is preferably provided by in each case at least one projection on the joint elements of the second spring element, said projection engaging in each case in a corresponding opening or in corresponding recesses on the joint elements of the first spring element. The projection is oriented substantially in a direction parallel to the longitudinal direction, such that the resulting form-fit connection prevents relative movements of the corresponding joint elements of the first spring element and second spring element in directions parallel to the transverse direction.

The form-fit connection between a joint element of the first spring element and a joint element of the second spring element is preferably provided by a change in the wall thickness of the spring elements across their width.

Such a variation of the wall thickness can take place abruptly, in which case, for example, the first spring element has, in the area of each of its joint elements, a rib which engages in a corresponding groove in the area of the joint elements of the second spring element.

Alternatively or in addition, the wall thickness of the first spring element, seen across the width of the first spring element, can vary continuously, wherein the wall thickness is greatest, for example, at the center and decreases toward the side edges. The wall thickness of the second spring element, seen across the width of the second spring element, accordingly also has a variation, wherein the wall thickness is at its smallest at the center and increases toward the side edges. The joint elements are here regarded as part of the spring element, such that the described variation of the wall thickness can take place at the joint elements of the spring elements.

The joints of the proposed muscle trainer securely connect the two spring elements, such that an unwanted separation of the spring elements does not take place. In preferred embodiments, relative movements of the paired joint elements are suppressed in all three spatial directions, wherein a rotational movement remains possible upon actuation of the muscle trainer. By means of this rotational movement, bending stresses upon actuation of the muscle trainer are advantageously substantially avoided in the end areas. The joints are advantageously compact and take up little room.

The muscle trainer is preferably designed in one piece or the muscle trainer is preferably composed of two pieces, wherein each piece comprises one of the spring elements. The first spring element and the second spring element are preferably both free of undercuts. This permits simple production of the spring elements by injection molding. Advantageously, the mold does not require movable slides, such that cost-effective production is permitted.

Printed details can preferably be provided on the muscle trainer by means of elevations or depressions. It is particularly preferable here to apply printed details in the form of elevations or depressions on the convex side of the second spring element, since in this way no undercuts are produced and, as before, particularly simple and cost-effective manufacture by injection molding remains possible.

If the muscle trainer is designed in one piece, the two spring elements of the muscle trainer are preferably connected to each other by resilient arcs arranged on each of the convex sides of the spring elements. The resilient arcs here allow the muscle trainer to be manufactured in one piece, wherein the joint elements do not yet have to be brought together to form the joints at the time of manufacture. The resilient arcs allow the two spring elements to move relative to each other, such that after manufacture, for example by injection molding, the respective joint elements can be brought together to form the joints.

The two spring elements are preferably produced from a thermoplastic.

The thermoplastic is preferably chosen from polyoxymethylene (POM), polybutylene terephthalate (PBT), polyamide (PA), acrylonitrile-butadiene-styrene (ABS) and polypropylene (PP).

To realize good sliding characteristics, in the case of which only low friction and no generation of noise arise during a movement of the joint elements relative to one another, in each case different materials should be used for the two spring elements. For example, one of the spring elements is manufactured from polyoxymethylene (POM) and the other spring element is manufactured from a thermoplastic material that differs therefrom. A disadvantage of this approach is, however, that the two spring elements possibly have different characteristics, in particular shrinkages.

As an alternative to this, it is possible for both spring elements to be manufactured from the same thermoplastic material, wherein a tribologically modified thermoplastic material is used. In particular, tribologically modified polyoxymethylene (POM) is suitable for this purpose. For an optimization of the tribological characteristics of the material, a silicone oil is normally added as an additive to the POM for this purpose. A suitable tribologically modified POM is available under the designation Ultraform N 2320 003 TR. In this design variant, it is preferable for both spring elements to be manufactured from the tribologically modified POM. This has the advantage that distortion or shrinkage during the manufacturing process affects both spring elements equally, such that the spring elements can be assembled to form the muscle trainer without problems and in an accurately fitting manner.

The plastic of the spring elements can be reinforced or non-reinforced, it being possible for a fiber-reinforced plastic to have a fiber content of up to 60% by weight. Suitable fibers are chosen, for example, from, glass fibers, aramid fibers, carbon fibers. The fibers can be present as short fibers, long fibers or "endless fibers". The stiffness of the spring elements, and therefore the stiffness of the muscle trainer, can be deliberately influenced by way of the fiber content.

An opposing force of the spring elements is preferably adjusted through the choice of the fiber content in the thermoplastic material, the fiber content being chosen in the range from 1% by weight to 50% by weight.

Moreover, the plastic can contain further additives according to requirements.

The force introduction areas of the spring elements preferably each comprise a force introduction element. The force introduction element (a gripping element in the case of use as a hand trainer) can be made from a material other than the material of the spring elements. In order to achieve haptics that are acceptable for the user, a material is preferably used which is soft by comparison with the material of the spring elements. For example, the gripping element is produced from a polyurethane foam or a formed thermoplastic elastomer.

The force introduction element preferably has a spacer on the concave side of the spring element, which spacer limits the bending of the muscle trainer.

A further aspect of the invention concerns providing a method for producing one such muscle trainer. To this end, a method is proposed comprising the steps of:

a) producing the first and second spring element by injection molding using at least one injection mold, b) bending the first spring element by applying force to the two end areas of the first spring element and/or curving the second spring element by applying force to the two end areas of the second spring element, c) inserting the second spring element into the first spring element, and d) terminating the force application onto the first spring element and/or onto the second spring element, wherein the joint elements of the first spring element and of the second spring element form joints.

In step a) of the method, the two spring elements are produced by injection molding. Advantageously, the two spring elements do not have any undercuts, such that the at least one injection mold used has no slides. The injection mold can therefore be produced particularly simply and cost-effectively.

After the production of the two spring elements, the joints are not yet brought together. To insert a joint element of the second spring element into the corresponding joint element of the first spring element, in step b), forces are exerted on the first spring element and/or on the second spring element. The first spring element is thereby bent, and its curvature decreases and/or the second spring element is more markedly curved, such that the second spring element can be inserted into the first spring element in accordance with step c). Thereafter, the application of force to the first spring element and/or to the second spring element is terminated (step d)). The one or more spring elements spring back to their respective starting position, whereupon the form-fit connection is established and the joints are formed. The muscle trainer is ready for use.

If the force introduction areas of the spring elements have force introduction elements made from a material other than that of the spring elements, then, in step a), after production of the spring elements, the latter are inserted or moved into a further mold in order to produce the gripping elements or, by pulling back slides, a corresponding mold for producing the force introduction elements is generated. The force introduction elements can then be injected onto the spring elements.

Alternatively, the force introduction elements can also be produced separately and then connected to the spring elements by a form-fit or force-fit engagement and/or by a cohesive fit.

A further aspect of the invention concerns the use of one of the described muscle trainers as hand trainer, arm trainer or leg trainer.

EXAMPLES

Various muscle trainers designed as hand trainers and each having identical geometric dimensions were produced. The thermoplastic used for the spring elements was varied in each case in order to produce hand trainers with different stiffness or different spring forces. Polyoxymethylene (POM) was used as the thermoplastic, the POM being non-reinforced in one example and being reinforced, in five other examples, with different contents of glass fibers.

The spring elements produced have a curved, elongate shape, wherein the width of the spring elements is 25 mm at the ends and 19 mm at the center of the spring elements. The length of the spring element without application of force, measured as direct connection line between the two ends, is 204 mm. The wall thickness of the material is 2.5 mm at the ends and 5 mm at the center. The curvature of the spring elements is such that, in the assembled state, the two spring elements are at a distance of 59 mm from each other at the center.

To calculate the opposing force of the spring elements during use in the muscle trainer, it was first necessary to determine the modulus of elasticity of the various plastics. To measure the modulus of elasticity of the plastic, specimens were produced and, in the tensile test as per ISO 527-2:1993, the force and the change in length were measured at a defined testing speed. The tensile tests were carried out on specimens made of polyoxymethylene (POM) with different glass fiber contents; the determined moduli of elasticity, which describe the stiffness of the specimen, are listed in Table 1. These were each determined at a testing speed of 1 mm/min.

TABLE 1

| Material | Modulus of elasticity [MPa] at 1 mm/min |
| --- | --- |
| POM non-reinforced | ~2700 |
| POM with 5% by weight fiber content | ~3500 |
| POM with 10% by weight fiber content | ~4600 |
| POM with 15% by weight fiber content | ~5950 |
| POM with 25% by weight fiber content | ~8800 |

The tensile tests show that, by addition of 5 to 25% by weight of glass fibers, the modulus of elasticity of the material can be increased from 2700 MPa for non-reinforced material to 8800 MPa for material reinforced with 25% by weight glass fiber content.

The calculation revealed that spring elements with a glass fiber content of 25% by weight were already too stiff for use as hand trainers. Therefore, spring elements for hand trainers were produced from non-reinforced material and from five materials with different glass fiber content. In each case, two spring elements with an identical fiber content were assembled to form a hand trainer, and the stiffness of the hand trainers produced was determined. For this purpose, a hand trainer was placed in a test apparatus in which a ram was used to exert force vertically on the force introduction area of one of the spring elements. The other spring element lay on a table, such that the hand trainer was increasingly pressed together by the exerted force. The deformation travel of the hand trainer and the exerted force were measured.

Figure 15:
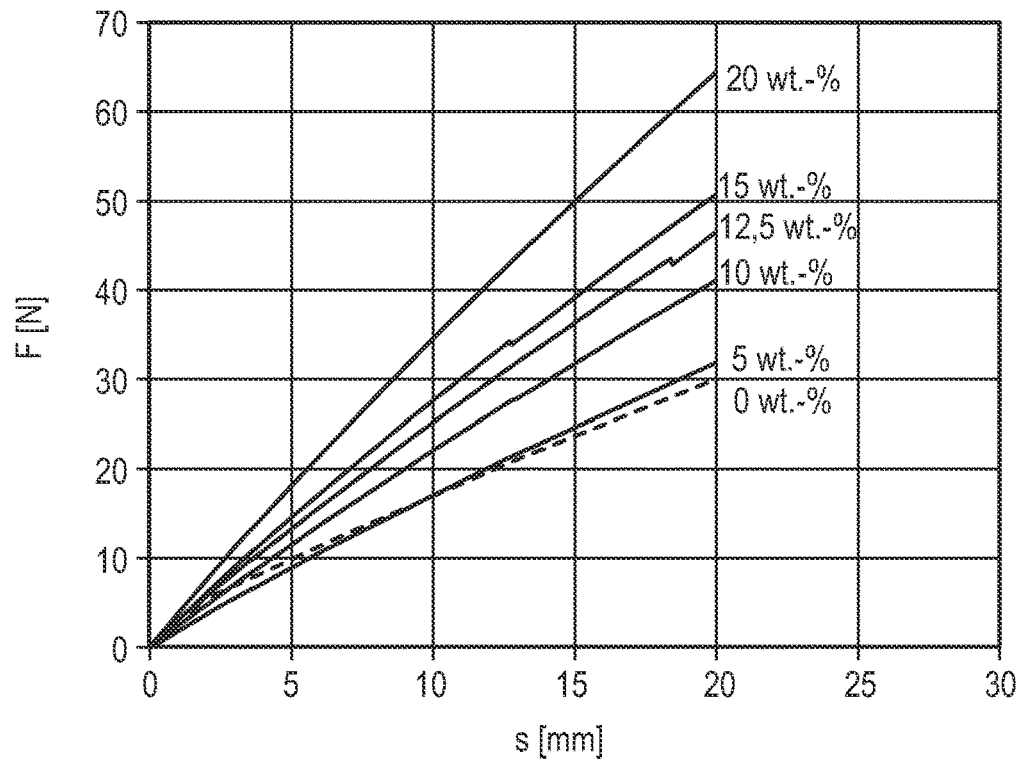

The measurement results for the five tested hand trainers are shown in FIG. 15. In the diagram in FIG. 15, the deformation travel is plotted in mm on the X axis and the force is plotted in N on the Y axis.

From the force-travel curves in FIG. 15, it will be seen that the hand trainers present a slightly non-linear behavior in the case of a short deformation travel, wherein the force needed for a defined deformation constantly increases with an increasing fiber content in the hand trainers with spring elements made from the fiber-reinforced material. The hand trainer made from the non-reinforced material has a stronger non-linear behavior, such that the force needed for a deformation up to approximately 3 mm deformation is at first approximately exactly as high as in the hand trainer with a 10% by weight fiber content. At a deformation travel of 10 mm, the force of the hand trainer made from non-reinforced material needed for the deformation corresponds to that of the hand trainer with a 5% by weight fiber content. Above 10 mm, all the hand trainers made from materials reinforced with fibers require a greater force than the hand trainer made from the non-reinforced material.

The stiffness of a hand trainer is defined as the gradient of the force-travel curve. On account of the slight non-linearity, the stiffness decreases slightly as the deformation travel increases.

The stiffness for the range of 15 mm to 20 mm deformation travel was evaluated in the range of the maximum measured deformation of 20 mm. The stiffness determined for the tested hand trainers is shown in Table 2.

TABLE 2

| Material | Stiffness [N/mm] |
| --- | --- |
| POM non-reinforced | 1.2 |
| POM with 5% by weight fiber content | 1.5 |
| POM with 10% by weight fiber content | 1.7 |
| POM with 12.5% by weight fiber content | 2.1 |
| POM with 15% by weight fiber content | 2.4 |
| POM with 20% by weight fiber content | 2.9 |

Illustrative embodiments of the invention are shown in the figures and are explained in more detail in the following description.

Figure 1A:
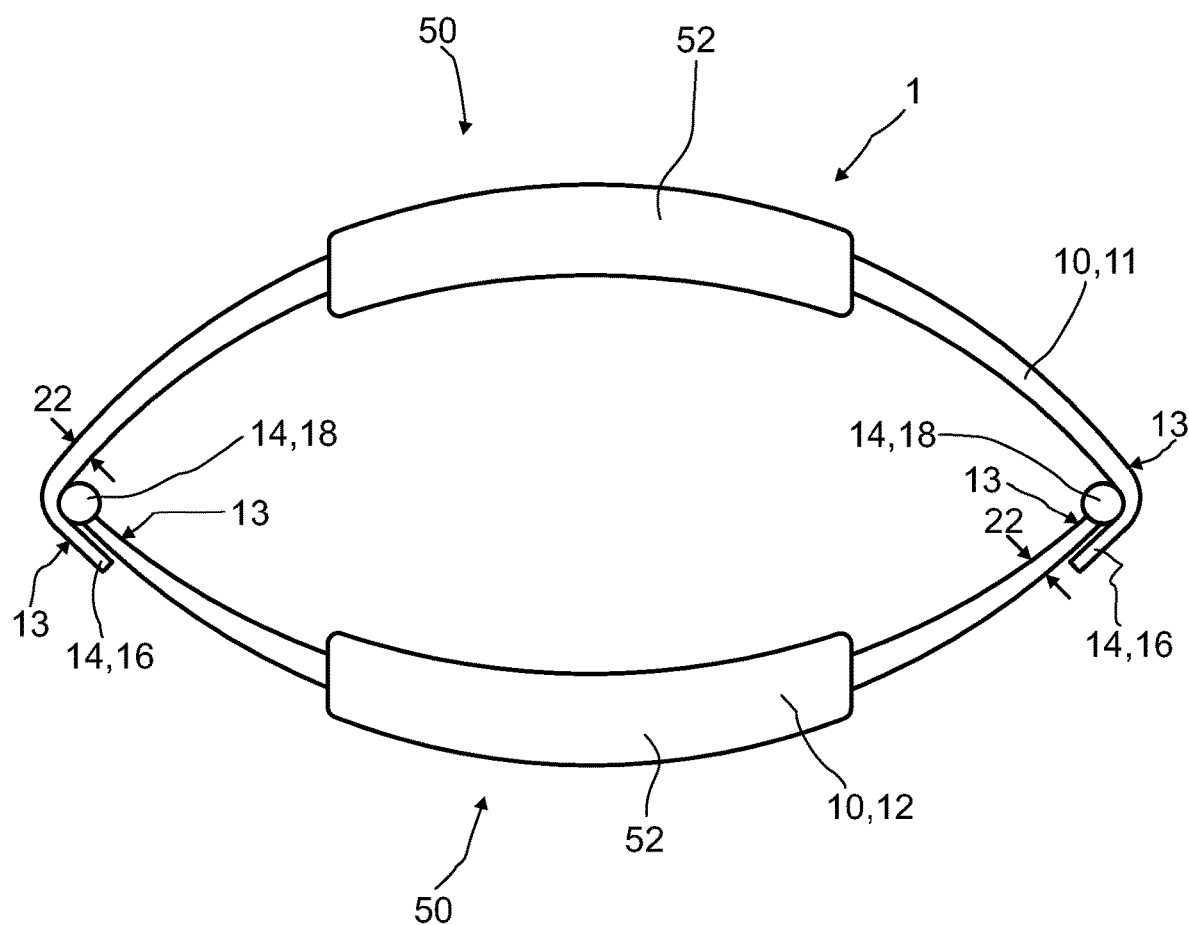
Figure 2:
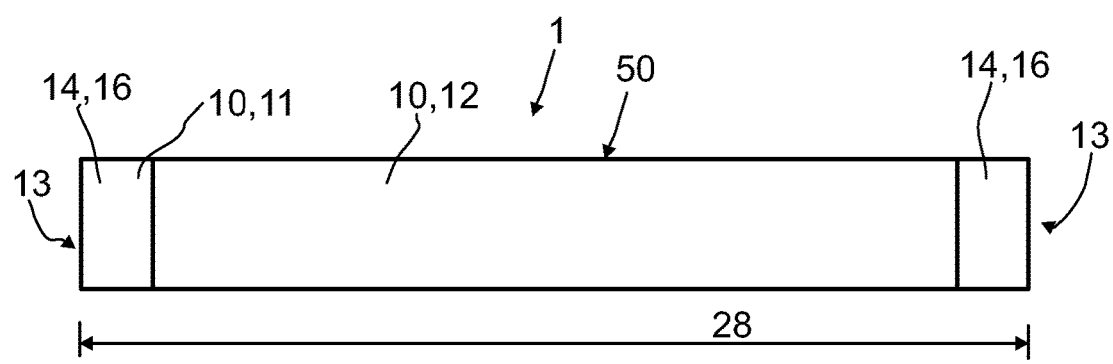
Figure 3:
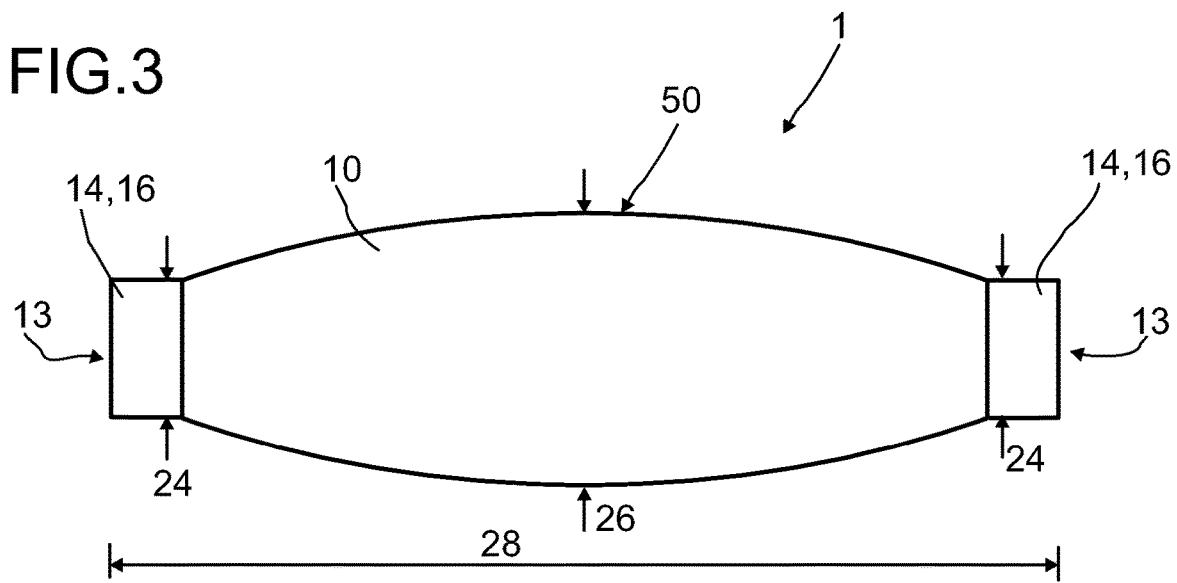
Figure 4:
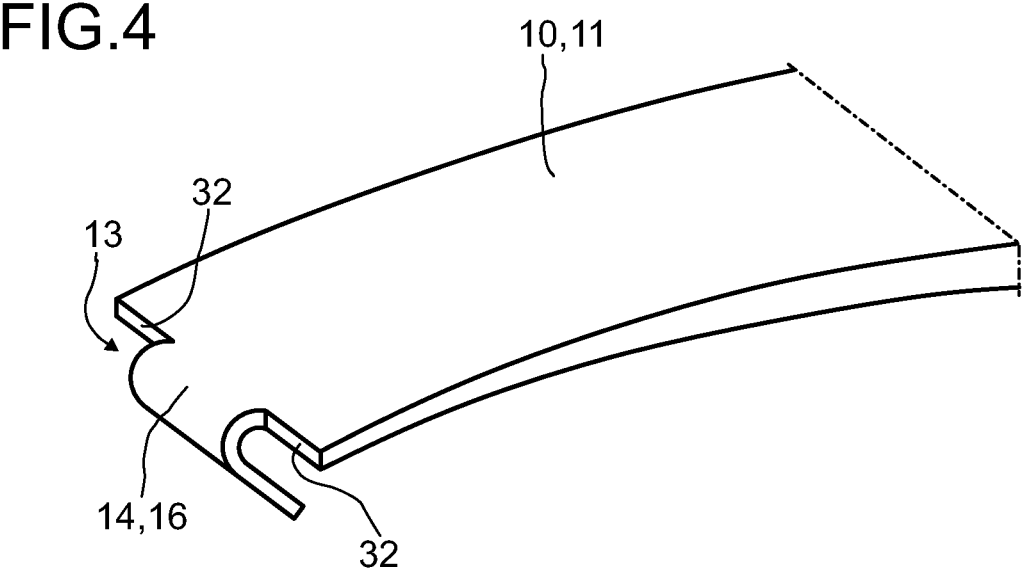
Figure 5:
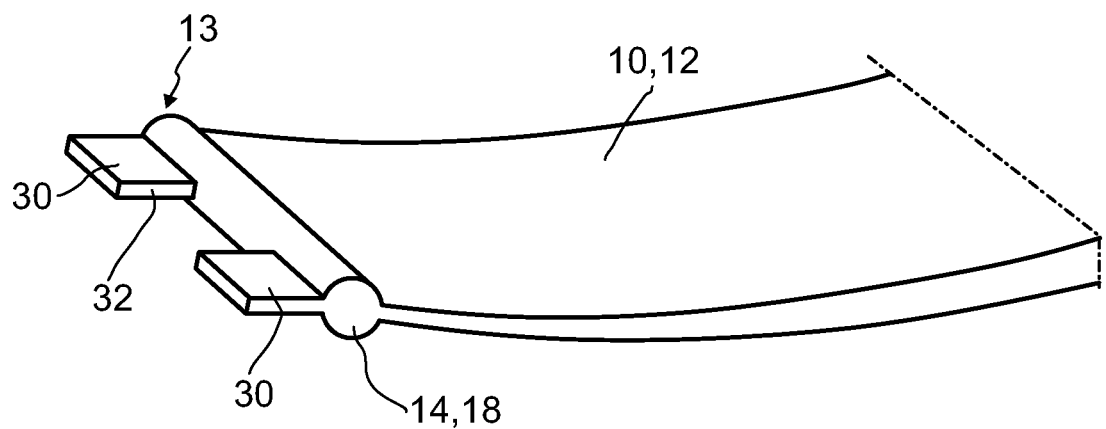
Figure 6:
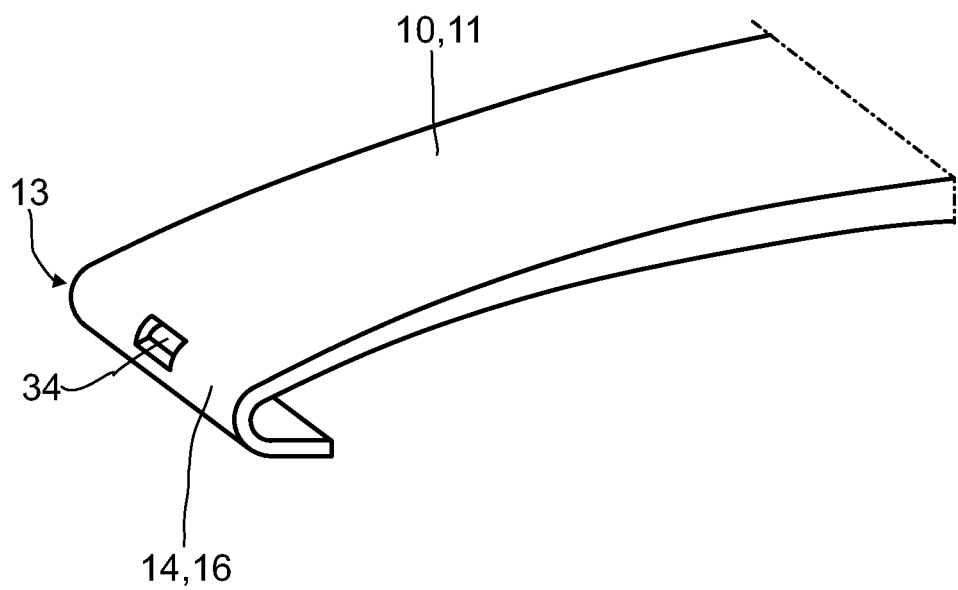
Figure 7:
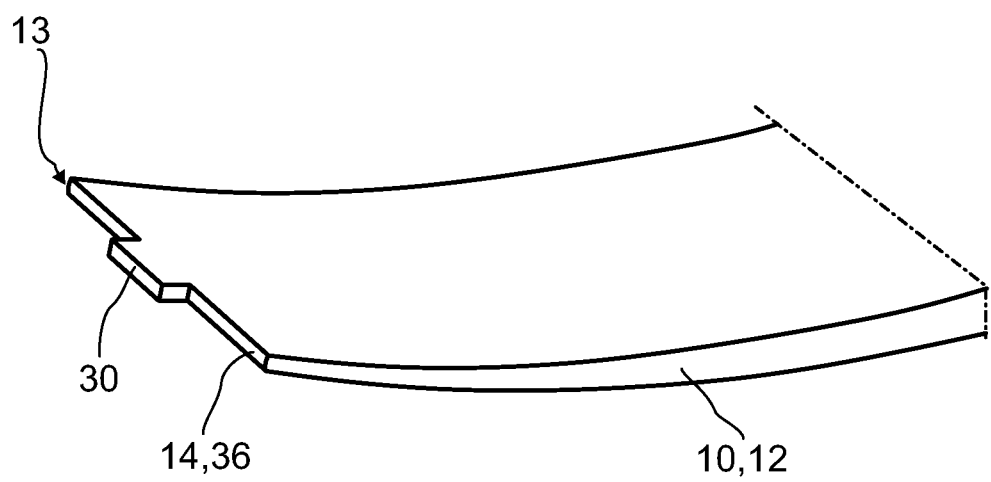
Figure 8:
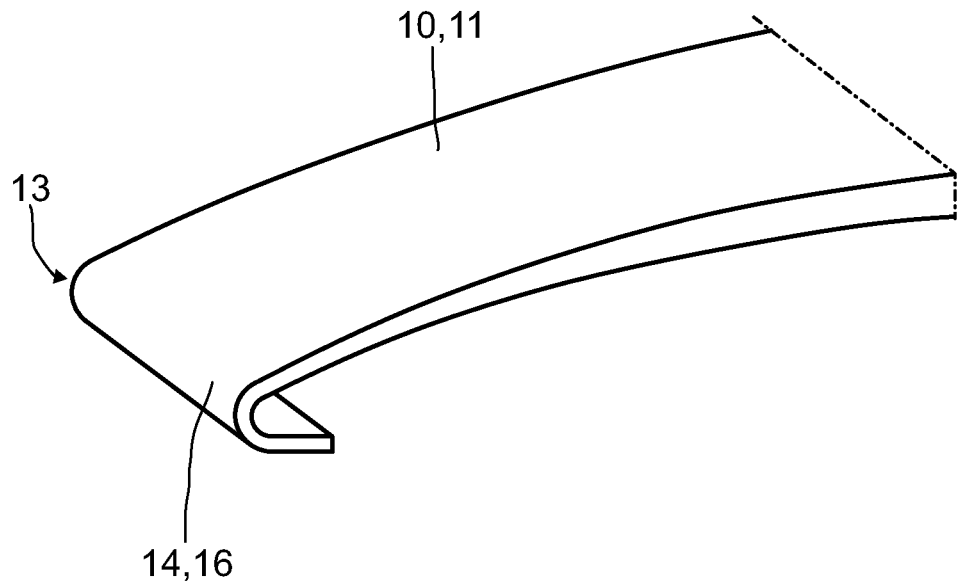
Figure 8A:
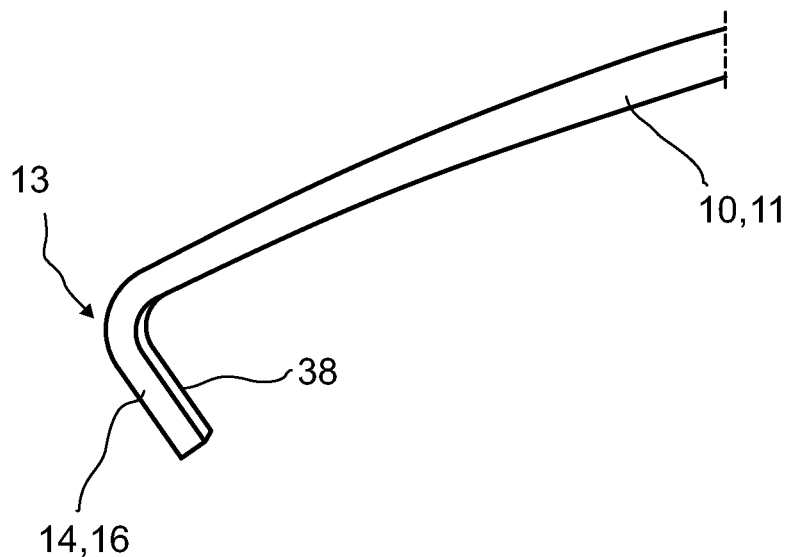
Figure 9:
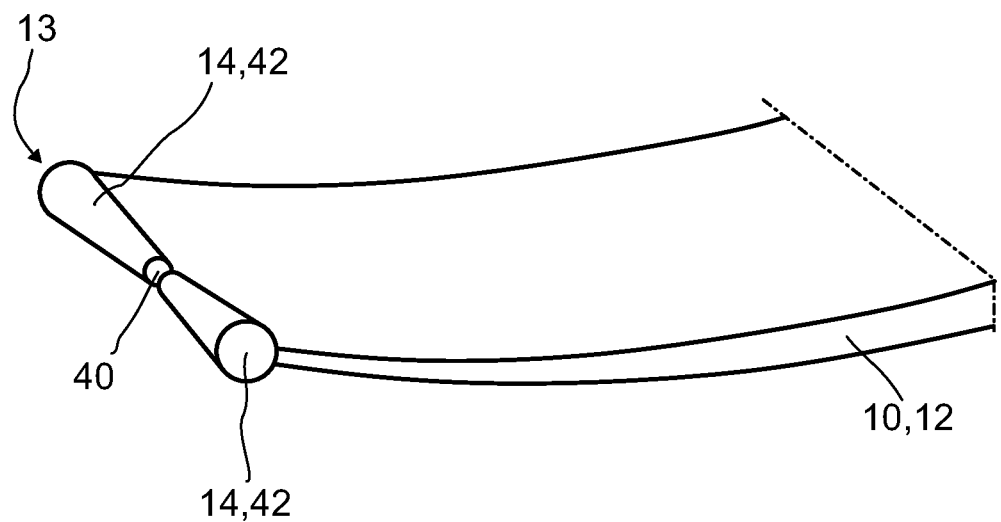
Figure 10:
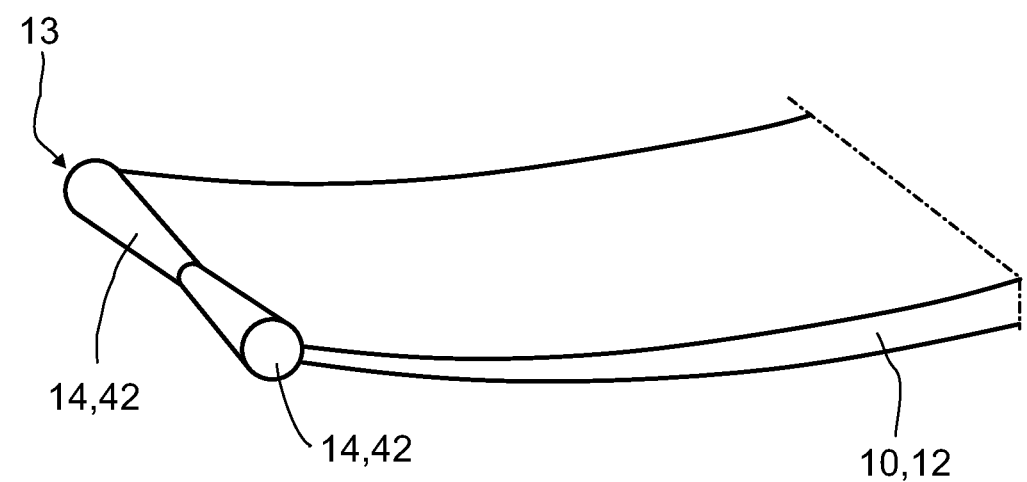
Figure 11:
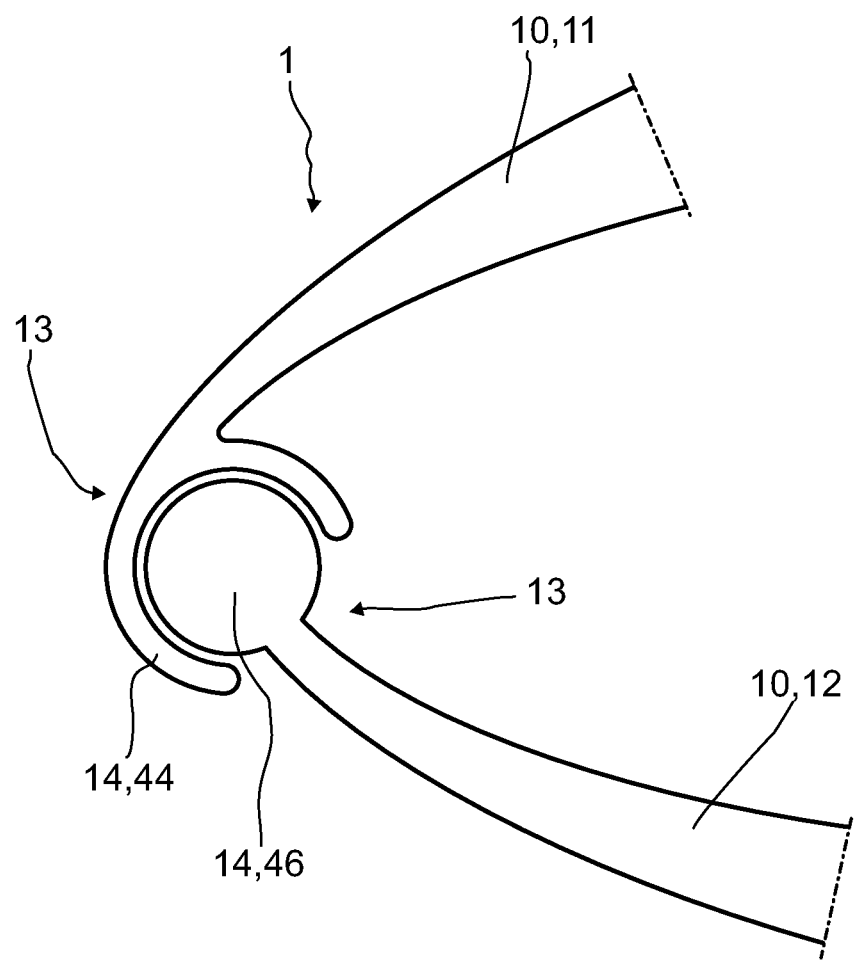
Figure 12:
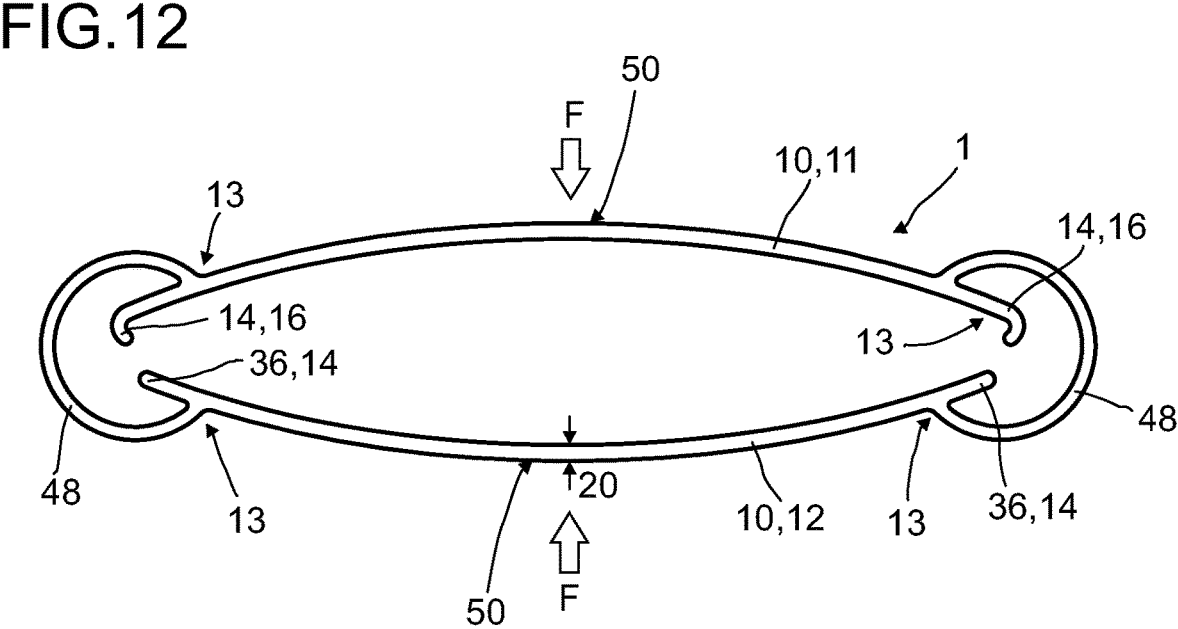
Figure 13:
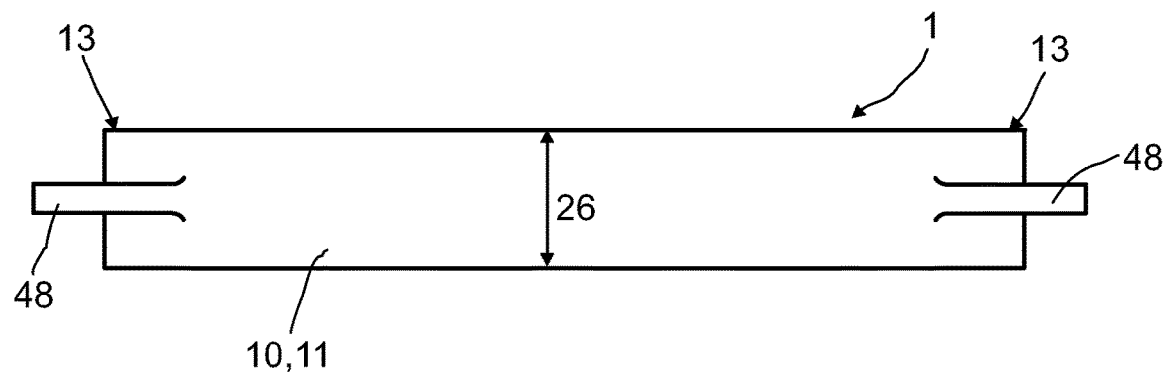
Figure 14:
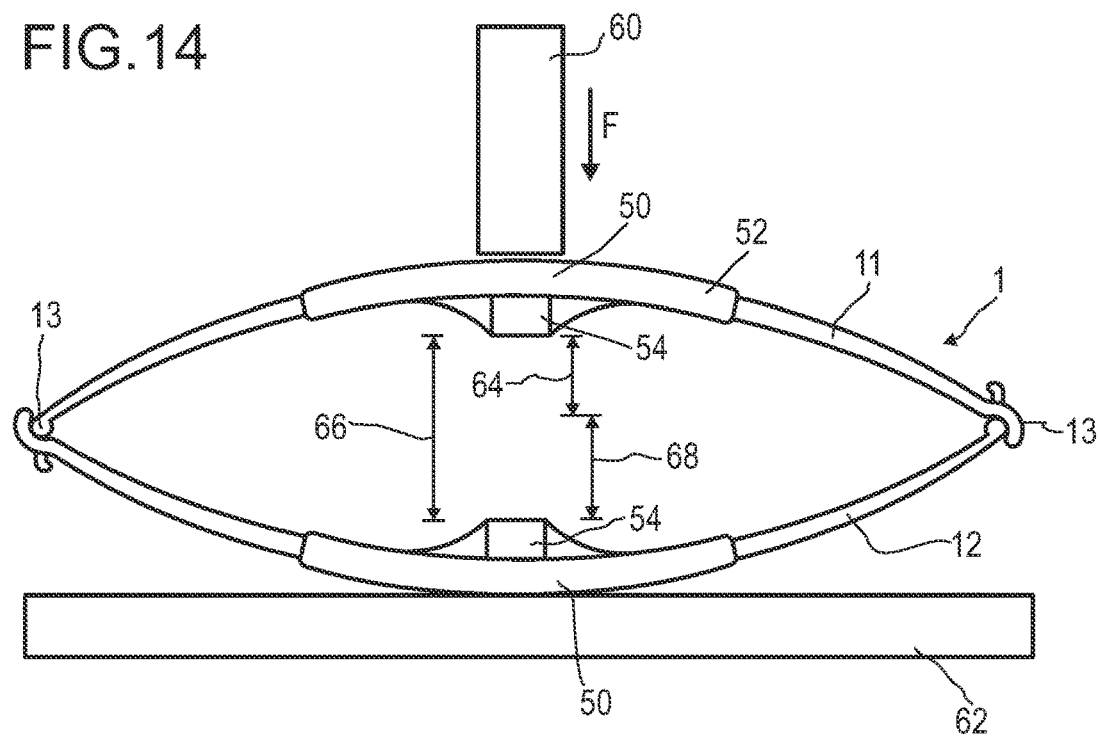

In the figures:

FIG. 1 shows a first embodiment of a muscle trainer in a view from the front,

FIG. 1a shows the muscle trainer of the first embodiment configured as a hand trainer with gripping elements, in a view from the front, FIG. 2 shows the muscle trainer of the first embodiment in a view from below, FIG. 3 shows a further embodiment of the muscle trainer in a view from below, FIG. 4 shows a perspective view of a first embodiment of a first spring element, FIG. 5 shows a perspective view of a first embodiment of a second spring element, FIG. 6 shows a perspective view of a second embodiment of a first spring element, FIG. 7 shows a perspective view of a second embodiment of a second spring element, FIG. 8 shows a perspective view of a third embodiment of a first spring element, FIG. 8a shows the third embodiment of the first spring element in a view from the front, FIG. 9 shows a perspective view of a third embodiment of a second spring element, FIG. 10 shows a perspective view of a variant of the third embodiment of a second spring element, FIG. 11 shows a fourth embodiment of a first and second spring element, FIG. 12 shows a one-piece embodiment of a hand trainer in a view from the front, FIG. 13 shows the one-piece embodiment of a hand trainer in a view from above, FIG. 14 shows a test arrangement for determining the stiffness of the muscle trainer, and FIG. 15 shows a force-travel diagram for various illustrative embodiments of the hand trainer.

In the following description of the illustrative embodiments of the invention, identical or similar elements are designated by identical reference signs, and the description of said elements is not repeated in every instance. The figures are purely schematic depictions of the subject matter of the invention.

FIG. 1 shows a first embodiment of a muscle trainer 1 in a view from the front. The muscle trainer 1 comprises two elongate, curved spring elements 10, namely a first spring element 11 and a second spring element 12.

The two spring elements 10 are crescent-shaped in the view from the front, in each case a joint element 14 being arranged at the respective end areas 13. The two spring elements 10 are arranged relative to each other in the hand trainer 1 in such a way that their concave sides face each other.

In the illustrative embodiment shown, the joint elements 14 of the first spring element 11 are designed as bent brackets 16, wherein the area of a bracket 16 directly adjoining the first spring element 11 is curved in the same direction as the spring element 11 but has a much smaller bend radius. The bracket 16 runs in an area which has no curvature.

In the illustrative embodiment shown, the corresponding joint elements 14 of the second spring element 12 are designed as rollers 18, wherein the radius of a roller 18 corresponds substantially to the bend radius of a bracket 16. The rollers 18 are oriented with their axes parallel to the transverse direction and each adjoin an end of the second spring element 12. A bracket 16 forms a bearing in which a roller 18 is rotatably mounted. In further variants, instead of rollers 18 as joint elements 14 of the second spring element 12, it is possible, for example, for the end areas 13 of the second spring element 12 to be rounded, wherein the radius of the rounding preferably corresponds to the bend radius of the bracket 16.

At the center, the spring elements 10 have force introduction areas 50. When the muscle trainer 1 is actuated, forces F act on the force introduction areas 50 perpendicularly with respect to the spring elements 10. In this way, the spring elements 10 bend elastically. No bending stresses or only very slight bending stresses occur at the end areas 13 of the spring elements 10, since the joint elements 14 permit a rotation. The greatest bending load occurs at the center of the spring elements 10 and decreases in the direction of the edge areas 13. Accordingly, it is preferable to vary the wall thickness of the spring elements 10 in accordance with the bending load, wherein the spring elements 10 have their greatest wall thickness 20 at the center, and the wall thickness decreases toward the end areas 13, such that the spring elements 10 have their smallest wall thickness 22 at the end areas 13. The longitudinal extent of the spring elements 10 is indicated by reference sign 28 in FIG. 1.

FIG. 1a is a view from the front showing an embodiment of the muscle trainer 1 as a hand trainer, with force introduction elements 52 designed as gripping elements. The hand trainer shown in FIG. 1a corresponds to the muscle trainer 1 described with reference to FIG. 1, except that the spring elements 10 each have a force introduction element 52 in the form of a gripping element at the force introduction areas 50. The gripping elements are preferably made from a material other than that of the spring elements 10. In order to improve the haptics, a material is preferably chosen here which is soft by comparison with the material of the spring elements 10. For example, the gripping elements 52 can be made from an expanded polyurethane.

The spring action of the muscle trainer 1 is set through the choice of the geometry of the spring elements 10 and through the choice of the material of the spring elements 10, in such a way that the maximum spring force lies in a range suitable for the use as a hand trainer. For this purpose, the maximum spring force is preferably set such that it lies in the range of 40 to 150 N. The maximum spring force lies particularly preferably in the range of 50 to 100 N.

The muscle trainer 1 of the first embodiment, described with reference to FIG. 1, is shown in a view from below in FIG. 2.

In this view from below, in conjunction with the view from the front in FIG. 1, it will be seen that the shape of the spring elements 10 can be described as a perpendicular cylinder segment, which has the crescent-shaped base surface visible in FIG. 1. It will likewise be seen in the view from below that the brackets 16 of the first spring element 11 at least partially enclose the second spring element 12 or the corresponding joint elements 14 thereof (not visible in FIG. 2; cf. FIG. 1).

FIG. 3 shows a further embodiment of the hand trainer 1 in a view from below. As has been described with reference to FIG. 1, the muscle trainer 1 has two spring elements 10 which are connected to each other at their end areas 13 via joint elements 14. In addition to or as an alternative to a variation of the wall thickness, provision is made, in the embodiment in FIG. 3, to vary the width of the spring elements 10 along the longitudinal extent 28. Since the greatest bending load occurs at the center of the spring elements 10, the spring elements 10 preferably have the greatest width 26 at the center. The width decreases in the direction of the edge areas 13, such that the smallest width 24 of the spring elements 10 is present at the edge areas 13.

FIG. 4 is a perspective view showing a detail of a first embodiment of a first spring element 11. As has already been described with reference to FIG. 1, the first spring element 11 has, at each of its end areas 13, a respective joint element 14 in the form of a bracket 16, only one end area 13 being visible in FIG. 4. The bracket 16 is arranged in such a way that the first spring element 11 transitions smoothly into the bracket 16. The bracket 16 is bent in the direction of the concave side of the first spring element 11. The bracket 16 has an area of strong curvature adjoining the first spring element 11 and running out, at its other end, in an area without curvature.

It will be seen from the view in FIG. 4 that the width of the bracket 16 is smaller than the width of the first spring element 11. Recesses 32 are located on both sides of the bracket 16, wherein the bracket 16 is arranged in a centered position, seen across the width of the spring element 11.

FIG. 5 is a perspective view showing a detail of a first embodiment of a second spring element 12. At its end area 13, the second spring element 12 has a joint element 14, which is designed as a roller 18. On the side opposite the spring element 12, the joint element 14 is adjoined by two projections 30. The orientation of the projections 30 is chosen in such a way that they are arranged in a direct continuation of the second spring element 12. A recess 32 is located between the two projections 30. The size, in particular the width, of the recess 32 is chosen such that the bracket 16 of the first spring element 11 shown in FIG. 4 can engage in the recess 32 between the two projections 30, and a form-fit connection is thereby established which prevents a relative movement between the first spring element 11 and the second spring element 12 in the transverse direction. Since the roller 18 is additionally mounted in the bracket 16, the form-fit connection also prevents a relative movement between the first spring element 11 and the second spring element 12 in a vertical direction.

FIG. 6 is a perspective view showing a detail of a second embodiment of a first spring element 11. As has already been described with reference to FIGS. 1 and 4, the first spring element 11 has, at its end area 13 visible in FIG. 6, a joint element 14 in the form of a bracket 16 which is bent in the direction of the concave side of the first spring element 11. The bracket 16 has an area of strong curvature adjoining the first spring element 11 and running out at its other end in an area without curvature.

In the illustrative embodiment shown in FIG. 6, the width of the bracket 16 corresponds to the width of the first spring element 11, and the bracket 16 is arranged in such a way that the first spring element 11 transitions smoothly into the bracket 16. In the area of greatest curvature of the bracket 16, the latter has an opening 34. The opening 34 is arranged centrally as seen across the width of the first spring element 11.

FIG. 7 is a perspective view showing a detail of a second embodiment of a second spring element 12. In the embodiment shown, the second spring element 12 has, at each of its end areas 13, a joint element 14 which is designed as a rounding 36. The radius of curvature of the rounding 36 preferably corresponds here to half the wall thickness of the second spring element 12 at the respective end, such that a smooth transition is present between the second spring element 12 and the roundings 36.

At each of its end areas 13, the second spring element 12 of the second embodiment has a projection 30, of which the width corresponds approximately to the width of the opening 34 of the second embodiment of the first spring element 11 shown in FIG. 6. In the assembled state of the muscle trainer 1, a form-fit connection is established between the projection 30 and the opening 34 and suppresses a relative movement between the first spring element 11 and the second spring element 12 in directions parallel to the transverse direction and parallel to the vertical direction. The rounding 36 is in this case mounted in a bearing formed by the bracket 16. The height of the opening 34 is preferably greater than the thickness of the projection 30, in order to permit a pivoting movement in the formed bearing when the muscle trainer is actuated.

FIG. 8 is a perspective view showing a detail of a third embodiment of a first spring element, and FIG. 8a shows the first spring element 11 of the third embodiment in a view from the front.

As has already been described with reference to FIGS. 1 and 4, the first spring element 11 has, at its end area 13 visible in FIG. 8, a joint element 14 in the form of a bracket 16 which is bent in the direction of the concave side of the first spring element 11. The bracket 16 has an area of strong curvature adjoining the first spring element 11 and running out at its other end in an area without curvature.

A rib 38 is arranged on the surface of each of the brackets 16 facing toward the concave side of the first spring element 11. The rib 38 can be seen only in the view from the front in FIG. 8a. The rib 38 is preferably arranged centrally with respect to the width of the first spring element 11. The ribs 38 constitute an abrupt change of the wall thickness in the areas of the brackets 16 of the first spring element 11. The rib 38 preferably establishes a form-fit connection with a corresponding groove 40 of a joint element 14 of the second spring element 12. In addition to or as an alternative to the provision of the ribs 38, provision can be made that, with respect to the width of the bracket 16, the wall thickness, starting from the edge, continuously increases or decreases in the direction of the rib 38.

FIG. 9 is a perspective view showing a detail of a third embodiment of a second spring element 12.

The second spring element 12 shown in FIG. 9 has, at its end area 13, a joint element 14 which is designed in the form of two truncated cones 42. The two truncated cones 42 are arranged in such a way that the top surfaces of the truncated cones 42 face each other. The cone axes of the truncated cones 42 are oriented parallel to the transverse direction. Located between the two truncated cones 42 there is a free space in the form of a groove 40, which can establish a form-fit connection together with a rib 38 of the first spring element 11. The angle between the cone axis and the surface line of the truncated cones 42 is preferably chosen such that it corresponds to the variation of the wall thickness of the bracket 16 of the first spring element 11 and likewise establishes a form-fit connection.

If the bracket 16 of the first spring element 11 has no further variation in wall thickness other than the rib 38, the joint element 14 is preferably designed as a roller 18 with a groove 40 at the center, wherein the roller 18 can also be regarded as two truncated cones 42 with an angle of 0° between the cone axis and the surface line.

If the first spring element 11 of the third embodiment has only a continuous variation of the wall thickness, and no rib 38, the groove 40 between the two truncated cones 42 can be omitted. This is shown in FIG. 10.

FIG. 11 shows a fourth embodiment of a first spring element 11 and of a second spring element 12 in a view from the front. FIG. 11 shows the two spring elements 10 in an assembled state of the muscle trainer 1.

The two spring elements 10 have joint elements 14 at each of their end areas 13, wherein the joint elements 14 of the first spring element 11 are designed as snap-action elements 44 and the joint elements 14 of the second spring element 12 are designed as latching elements 46.

The latching elements 46 and the snap-action elements 44 both represent functional elements which together produce a snap-fit connection between the first spring element 11 and the second spring element 12. The snap-action element 44 represents the functional element which, in the resulting form-fit connection, at least partially encloses the functional element designated as latching element 46.

The snap-action elements 44 and the latching elements 46 are preferably designed as vertical cylinders, wherein the latching element 46 in the illustrative embodiment shown is in the form of a vertical circular cylinder. In the example shown in FIG. 11, the snap-action element is designed as a cylinder with a circular ring segment as base surface, wherein the cutout from the circular ring is greater than 180°. Thus, the latching element 46 is enclosed by the snap-action element 44 in such a way that the snap-action element 44 has to be elastically deformed in order to release or produce the snap-fit connection.

The form-fit connection limits a relative movement between the two spring elements 10 in such a way that accidental separation of the two spring elements 10 is suppressed or at least made difficult.

The embodiments described with reference to FIGS. 4 to 5 and 8 to 10 can also be combined with the embodiment described with reference to FIG. 11.

FIG. 12 shows a one-piece embodiment of a muscle trainer 1 designed as a hand trainer, in a view from the front.

The muscle trainer 1 shown in FIG. 12 and designed as a hand trainer is designed in one piece and comprises two elongate curved spring elements 10, namely a first spring element 11 and a second spring element 12. The two spring elements 10 are crescent-shaped in the view from the front, wherein a respective joint element 14 is arranged on each of the end areas 13. The two spring elements 10 are arranged relative to each other in the muscle trainer 1 in such a way that their concave sides face each other.

The muscle trainer 1 is shown in a state in which the joint elements 14 of the spring elements 10 are not yet brought together to form joints. In the illustrative embodiment shown, the joint elements 14 of the first spring element 11 are designed as bent brackets 16, wherein the area of a bracket 16 directly adjoining the first spring element 11 is curved in the same direction as the spring element 11 but has a much smaller bend radius. The bracket 16 runs out in an area that has no curvature.

In the illustrative embodiment shown, the corresponding joint elements 14 of the second spring element 12 are designed as roundings 36, wherein the radius of the roundings corresponds substantially to half the wall thickness of the second spring element 12 in the edge area 13 thereof and likewise substantially corresponds to the bend radius of the bracket 16. The roundings 36 each adjoin the ends of the second spring element 12 and merge seamlessly into the second spring element 12. A bracket 16 here forms a bearing in which the rounding 36 can be mounted rotatably.

In the one-piece muscle trainer 1, the two spring elements 10 are connected to each other via two resilient arcs 48. For this purpose, the spring elements 10 each have, at their end areas 13, connections to one of the resilient arcs 48. The resilient arcs 48 permit a relative movement between the two spring elements 10, such that the initially still separate joint elements 14 can be brought together to form the joints. For assembly, a force is applied for example to the end areas 13 of the first spring element 11, such that the first spring element 11 deforms and the curvature of the first spring element 11 is reduced. The second spring element 12 is then inserted into the first spring element 11, such that a joint element 14 of the first spring element 11 forms a joint with a joint element 14 of the second spring element 12 after the force has been removed from the first spring element 11. After assembly, the two spring elements 10 are connected to each other at their end areas 13 by a joint and a resilient arc 48.

At the center, the spring elements 10 have force introduction areas 50. When the muscle trainer 1 designed as a hand trainer is actuated, forces F act on the force introduction areas 50 perpendicularly with respect to the spring elements 10. In this way, the spring elements 10 bend elastically. No bending stresses or only very slight bending stresses occur at the end areas 13 of the spring elements 10, since the joint elements 14 permit a rotation. The greatest bending load occurs at the center of the spring elements 10 and decreases in the direction of the edge areas 13. In the embodiment shown in FIG. 12, the wall thickness 20 of the spring elements 10 is constant along their entire length. In further embodiments, it is preferable to vary the wall thickness of the spring elements 10 in accordance with the bending load, wherein the spring elements 10 have their greatest wall thickness 20 at the center, and the wall thickness decreases toward the end areas 13.

In FIG. 13, the one-piece embodiment of the muscle trainer 1 designed as a hand trainer is shown in a view from above. The muscle trainer 1 is not yet assembled. The second spring element 12 is completely concealed by the first spring element 11.

In the embodiment shown in FIG. 13, the width of the two spring elements 10 does not vary along the length of the spring elements 10, with the result that the spring elements 10 have the constant width 26. It will likewise be seen from the view in FIG. 13 that the width of the resilient arcs 48 is much smaller than the width of the spring elements 10. The resilient arcs 48 are preferably arranged centrally, seen with respect to the width of the spring elements 10.

FIG. 14 shows a schematic view of a test arrangement for determining the stiffness of a muscle trainer.

To determine the stiffness, a force-travel measurement is carried out in which a deformation travel 64 is determined. For this purpose, the muscle trainer 1 to be tested is placed on a table 62, wherein one of the spring elements 12 bears with its force introduction area 50 on the table 62. A force F is exerted on the force introduction area 50 of the other spring element 11 via a ram 60. The distance between two spacers 54 thereby decreases from a first distance 66 to a second distance 68. The difference between the first distance 66 and the second distance 68 corresponds to the deformation travel 64. The maximum spring force and the maximum spring deformation can be limited by the spacers 54 introduced between the force introduction areas 50 of the two spring elements 11, 12. In this case, the curvature of the spring elements 11, 12 is not completely canceled even when the maximum spring force is applied.

In the design variant of the hand trainer 1 shown in FIG. 14, the two spring elements 11, 12 are each identical.

The deformation travel 64 and the associated force F are recorded during the measurement.

FIG. 15 shows a force-travel diagram for various illustrative embodiments of the hand trainer.

In the diagram in FIG. 15, the deformation travel is plotted in mm on the X axis and the force is plotted in N on the Y axis. The diagram shows measurements for six different examples of a hand trainer which each have identical dimensions and differ only in terms of the fiber content of the plastic used for the spring elements. The spring elements were produced from polyoxymethylene (POM) with fiber contents of 0% by weight, 5% by weight, 10% by weight, 12.5% by weight, 15% by weight and 20% by weight.

From the force-travel curves in FIG. 15, it will be seen that the hand trainers present a slightly non-linear behavior in the case of a short deformation travel, wherein the force needed for a defined deformation constantly increases with an increasing fiber content in the hand trainers with spring elements made from the fiber-reinforced material.

LIST OF REFERENCE SIGNS 1 muscle trainer
10 spring element
11 first spring element
12 second spring element
13 end area
14 joint element
16 bracket
18 roller
20 wall thickness center
22 wall thickness end area
24 width end area
26 width center
28 length
30 projection
32 recess
34 opening
36 rounding
38 rib
40 groove
42 truncated cone
44 snap-action element
46 latching element
48 resilient arc
50 force introduction area
52 force introduction element
54 spacer
60 ram
62 table
64 deformation travel
66 distance, unloaded
68 distance, loaded
F force application

The invention claimed is:

1. A muscle trainer having a first curved, elongate spring element and a second curved, elongate spring element, wherein the two spring elements are arranged with their concave sides facing each other, each of the spring elements has joint elements at their respective end areas and the spring elements are connected to each other at their two end areas via joints formed from the joint elements in order to form the muscle trainer, wherein the muscle trainer is formed in one piece or consists of the first spring element and the second spring element, and wherein the joint elements of the first spring element are designed as brackets, the brackets being bent in the direction of the concave side of the first spring element and partially enclosing the joint elements of the second spring element, wherein the joint elements of the second spring element are rollers or have a rounded configuration, and a first joint element in form of a bracket in each case forms a bearing in which the respective second joint element of the second spring element is rotatably mounted.

2. The muscle trainer according to claim 1, wherein the joint elements of the first spring element are designed as snap-action elements, the joint elements of the second spring element are designed as latching elements, and the latching elements are received in the snap-action elements.

3. The muscle trainer according to claim 1, wherein a respective joint element of the first spring element establishes a form-fit connection with a joint element of the second spring element, wherein the form-fit connection prevents a lateral movement of the first spring element relative to the second spring element.

4. The muscle trainer according to claim 3, wherein the form-fit connection is provided by in each case at least one projection on the joint elements of the second spring element, said at least one projection engaging in each case in a corresponding opening or in corresponding recesses on the joint elements of the first spring element.

5. The muscle trainer according to claim 3, wherein the form-fit connection is provided by a change in the wall thickness of the spring elements across their width.

6. The muscle trainer according to claim 5, wherein the first spring element has, in the area of each of its joint elements, a rib which engages in a corresponding groove in the area of the joint elements of the second spring element.

7. The muscle trainer according to claim 5, wherein the wall thickness of the first spring element, seen across the width of the first spring element, is greatest at the center and decreases toward the side edges, and the wall thickness of the second spring element, seen across the width of the second spring element, is accordingly at its smallest at the center and increases toward the side edges.

8. The muscle trainer according to claim 1, wherein the first spring element and the second spring element are both free of undercuts.

9. The muscle trainer according to claim 1, wherein the two spring elements of the one-piece muscle trainer are connected to each other by resilient arcs arranged on each of the convex sides.

10. The muscle trainer according to claim 1, wherein the two spring elements are produced from a thermoplastic.

11. The muscle trainer according to claim 10, wherein the thermoplastic is chosen from polyoxymethylene (POM), polybutylene terephthalate (PBT), polyamide (PA), acrylonitrile-butadiene-styrene (ABS) and polypropylene (PP).

12. A method for producing a muscle trainer according to claim 1, comprising the steps of
  a) producing the first spring element and the second spring element by injection molding using at least one injection mold,
  b) bending the first spring element by applying force to the two end areas of the first spring element and/or curving the second spring element by applying force to the two end areas of the second spring element,
  c) inserting the second spring element into the first spring element,
  d) terminating the force application onto the first spring element and/or onto the second spring element, wherein the joint elements of the first spring element and of the second spring element form joints.

13. A method training hand muscles comprising actuating a muscle trainer according to claim 1.

* * * * *